United States Patent
Schliesser et al.

[19]

[11] Patent Number: 5,947,809
[45] Date of Patent: Sep. 7, 1999

[54] METHOD AND APPARATUS FOR FILLING SAUSAGE CASINGS

[75] Inventors: Gerhard Schliesser; Markus Schliesser, both of Wain; Klaus Schmid, Daugendorf, all of Germany

[73] Assignee: Albert Handtmann Maschinenfabrik GmbH & Co. KG, Germany

[21] Appl. No.: 09/098,615

[22] Filed: Jun. 17, 1998

[30] Foreign Application Priority Data

Jun. 20, 1997 [DE] Germany .............. 197 26 238

[51] Int. Cl.[6] ............................... A22C 11/02
[52] U.S. Cl. ............................... 452/31; 452/35
[58] Field of Search .................. 452/31, 32, 29, 452/37, 47, 35

[56] References Cited

U.S. PATENT DOCUMENTS

| | | | |
|---|---|---|---|
| 3,191,222 | 6/1965 | Townsend . | |
| 3,330,160 | 7/1967 | Stevenson | 452/31 |
| 4,370,779 | 2/1983 | Meier | 452/31 |
| 4,451,954 | 6/1984 | Müller et al. | 452/31 |
| 5,083,970 | 1/1992 | Reutter | 452/46 |
| 5,113,635 | 5/1992 | Takai et al. | 452/31 |
| 5,147,239 | 9/1992 | Staudenrausch | 452/47 |

FOREIGN PATENT DOCUMENTS

| | | |
|---|---|---|
| 0232812 | 1/1987 | European Pat. Off. . |
| 2402817 | 7/1975 | Germany . |
| 9001076 | 10/1990 | Germany . |

*Primary Examiner*—Willis Little
*Attorney, Agent, or Firm*—Tilton, Fallon, Lungmus & Chestnut

[57] ABSTRACT

The present invention relates to a method for filling sausage casings, comprising a filling machine in which the filling material is ejected through a filling tube into a sausage casing, said casing being twisted off after a portion which is representative of an individual sausage has been filled in, so as to form individual sausages, the filled sausage casing being discharged at a speed which is set in dependence upon a set filling-material output characteristic. For obtaining sausages of identical length and volume in a natural casing, the sausage discharge speed is controlled according to the invention in compliance with a function which is applied to the set filling-material output characteristic and comprises charge-dependent parameters, the function simulating the actual filling-material output characteristic. In the apparatus of the invention, there is provided a control unit for controlling the speed of the length-adjusting device according to said charge-dependent function in dependence upon the set filling-material output characteristic.

10 Claims, 4 Drawing Sheets

METHOD AND APPARATUS FOR FILLING SAUSAGE CASINGS

The present invention relates to a method for filling sausage casings with the aid of a filling machine in which filling material is ejected through a filling tube into a sausage casing which is twisted off after a respective portion has been filled in to form individual sausages, the twisted-off sausages being discharged at a speed which is set in dependence upon a set filling-material output characteristic. Furthermore, the present invention relates to an apparatus for performing such a method.

Filling machines are normally used in the automatic production of sausages. Such filling machines introduce sausage meat through a filling tube into a sausage casing. To this end, the sausage casing has previously been mounted in a folded state directly on the filling tube or on a corresponding sleeve which is slid over the filling tube. In general, a so-called casing brake or a brake ring is positioned at the end of the filling tube. After ejection of a sausage meat portion from the filling tube, with the portion corresponding to an individual sausage, the sausage casing is twisted off with the help of the brake ring gear and a twist-off device.

To press the sausage meat through the filling tube, a corresponding filling unit is used which conveys the sausage meat intermittently into the filling tube. Such a filling machine is, for instance, described in European patent no. 0232812.

To guarantee the production of sausages having a constant length, a driven length-adjusting device is arranged downstream of the filling tube. Such a length-adjusting device pulls the sausage sleeve through the brake ring from the filling tube. During the twist-off operation, the sausage which has already been filled is prevented by the length-adjusting device from rotating with the rotated part of the sausage casing.

The length of the individual sausages can be fixed by adjusting the sausage discharge speed during sausage filling in relation to the filling-material output speed. The speed at which the filled sausage casing is to be conveyed is set in dependence upon a set filling-material output speed.

Such a method is described in German patent specification 2402817.

In the method described in said specification, the discharge speed of the length-adjusting device is controlled in direct proportion to the speed of the filling unit inside the filling machine.

However, as becomes apparent, volume and external shape of the individual sausages can only be reproduced to an unsatisfactory degree by a control in proportion to the set filling-material output, especially when a natural casing is used as the sausage casing. On the one hand, wall thickness and also caliber are not constant in the case of natural casings, resulting in different sausage shapes. On the other hand, a non-uniform outer shape may be obtained because of a variable extensibility in the case of a non-uniform filling-material output characteristic.

In view of such a prior art it is the object of the present invention to provide a method and an apparatus for filling sausage casings with the aid of which sausages of equal length and equal volume can be produced, in particular also with a natural casing as the sausage casing.

In the method of the invention, the sausage discharge speed is chosen in dependence upon the actual filling-material output characteristic to be expected, including parameters which influence the actual filling-material output.

Such a solution is based on the finding that the actual filling-material output characteristic need not necessarily be identical with the value set for the filling-material output characteristic, which is e.g. predetermined by the motional characteristic of the filling unit, for instance, the delivery pump, and that the feature of importance to a uniform filling of a natural sausage casing is how the filling-material output actually looks like. When the actual filling-material output characteristic is not uniform, and if, in accordance with the invention, the discharge speed of the filled sausage casing is adapted to this actual filling-material output characteristic, it is possible, as has been found, to produce sausages in a natural casing of identical length and identical volume, also in the case of a tight filling. The simulation of the actual filling-material output characteristic to be expected includes the predetermined set filling-material output characteristic and other parameters for controlling the speed of the length-adjusting device. A more uniform filling of the sausage casing is ensured by discharging the filled sausage casing at a speed which takes into account the actual filling-material output characteristic to be expected. Moreover, it has been found that irregularities of the wall thickness and of the caliber, as are e.g. found in a natural casing, are compensated for in the case of such a quite uniform filling operation. Different flexibilities and extensibilities of the casing material are substantially without any effect. Thanks to a more exact control of the speed characteristic in accordance with the caliber and the portion output, the shape of the sausage is defined by the conveying belts. Portion length and filling caliber can be changed within specific limits via the speed characteristic of the conveying belts relative to the filling-material output characteristic. Moreover, the length of the portion may be shorter or longer than in conventional production modes. To be more specific, the differences in diameter are also smaller across one portion length.

The compressibility of the filling material is included as a parameter in a particularly advantageous manner. Depending on the compressibility of the filling material, the set filling-material output characteristic which is predetermined by the filling unit is implemented at the filling tube outlet to a more or less satisfactory degree.

Compressibility can simply be determined by a pressure measurement performed in the filling material to be ejected. The compressibility of the filling material can be determined from such a pressure measurement for the volume to be ejected by the filling device.

According to a development of the method of the invention, the compressibility of the filling material is determined in advance and the dependence of the sausage discharge speed is chosen accordingly. Compressibilities can be determined in preceding tests or with the help of experimental values for different types of sausages, and the actual filling-material output characteristic to be expected can be determined in advance at the end of the filling tube in the case of a given set filling-material output characteristic of the filling machine.

According to a development of the method of the invention, the dimensions of the filling tube are included in the estimation regarding the actual filling-material output to be expected. Depending on the length and diameter of the filling tube, the set filling-material output characteristic which is predetermined by the filling machine is reproduced at the filling tube end to a more or less satisfactory degree. For instance in the case of a long filling tube having a small cross-section the actual filling-material output characteristic deviates to a greater degree from the set filling-material output characteristic as predetermined by the pump.

According to an embodiment the set filling-material output characteristic is directly determined on the basis of the motional characteristic of the filling unit in the filling machine. The sausage discharge speed can be fixed in dependence upon the parameter on the basis of the set filling-material output characteristic determined in this manner.

Furthermore, the object of the present invention is solved by a device for filling sausage casings. In the apparatus of the invention, there is provided a control unit which controls the speed of the length-adjusting device in dependence upon the filling-material output to be expected. The method of the invention can then be carried out with such an apparatus.

According to an embodiment, there is provided an entry possibility for entering parameters. With the aid of such an entry possibility a user may enter parameters from the outside into the machine. On the basis of such parameters, the control unit then determines the actual filling-material output characteristic to be expected, namely at a predetermined set filling-material output characteristic, so as to define the sausage discharge speed of the length-adjusting device.

According to a further development, there may be provided a sensor which determines the compressibility of the filling material. Such a sensor permits an in-situ measurement of the compressibility of the filling material so that said parameter need not be determined or entered in advance. The sensor may, for instance, be provided in the area of the filling tube output.

Advantageously, there is provided a storage means for storing characteristics of the sausage discharge speed which have been determined in advance for different parameter values (for instance, in accordance with different types of sausages or dimensions of the filling tube). When corresponding parameters are entered by a user, the control unit can request a corresponding characteristic from the storage unit, thereby defining the sausage discharge speed of the length-adjusting device in consideration of the set filling-material output.

A control unit of the invention can be used in a particularly efficient manner in a filling machine which comprises a vane-cell pump as the delivery pump.

The present invention shall now be explained in more detail with reference to the enclosed figures, of which FIG. 1 schematically shows an embodiment of an apparatus according to the invention for filling sausage casings, with the aid of which apparatus the method according to the invention can be carried out;

Figure 1:
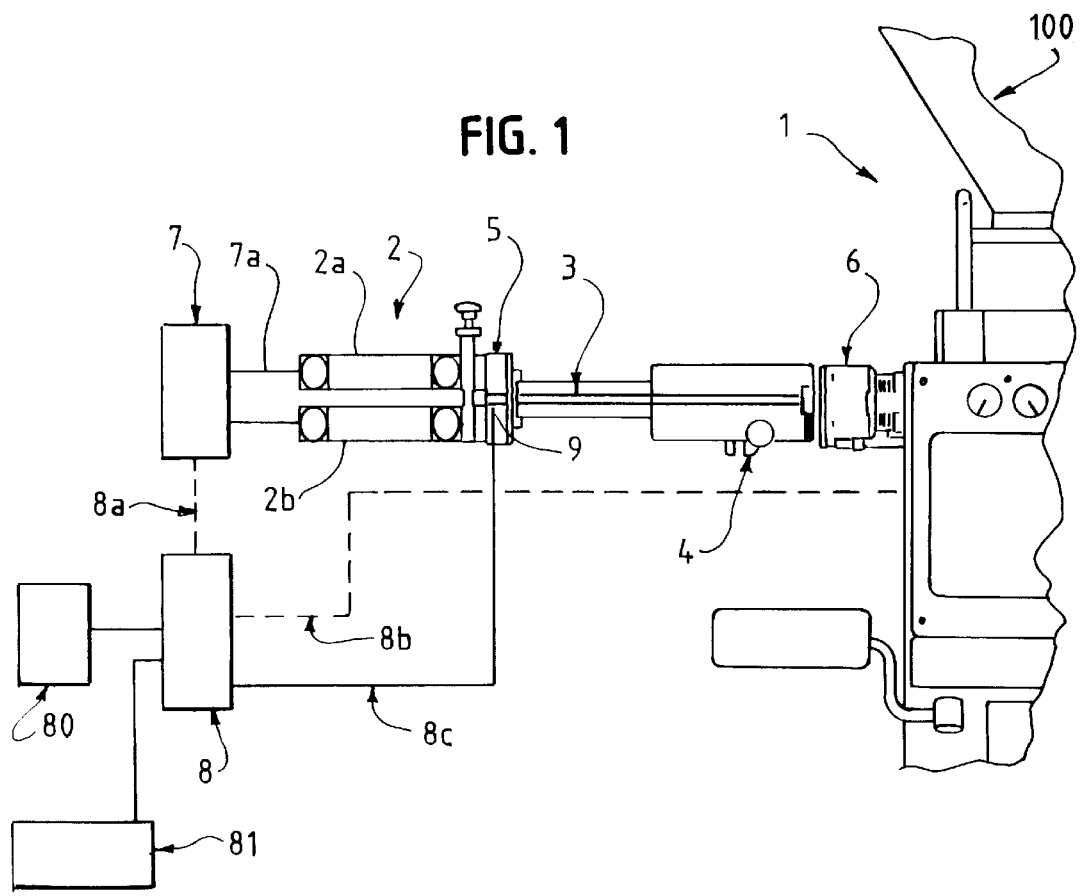

FIG. 1 diagrammatically shows an embodiment of the apparatus of the invention and illustrates the ejection area of a filling machine 1. Reference numeral 100 designates a feeding hopper for sausage meat. The sausage meat is ejected from the filling tube 3. To this end, a vane-cell pump (not shown) is provided inside the filling machine 1. The filling tube 3 can be rotated about its own axis with the aid of the twist-off device 6. At the end of the filling tube, there is provided a brake ring housing 5 through which the sausage casing is withdrawn with the aid of the length-adjusting device 2, while being filled by the filling tube 3.

The length-adjusting device 2 comprises two driven endless belts 2a and 2b which convey the filled sausage thereinbetween. The brake ring housing and the length-adjusting device are pivotable relative to the filling tube 3 with the aid of a pivot lever 4.

Reference numeral 7 designates a drive for the endless belts 2a and 2 of the length-adjusting device, the drive being drivingly connected to the endless belts via connections 7a (not shown in more detail). A control unit 8 which communicates via a line 8a with the drive 7 is provided for controlling the speed of said drive. Another line 8b may be provided for connecting the control unit to the filling machine 1. A pressure metering device 9 may be provided at the filling tube output for determining the compressibility of the sausage meat and to transmit the compressibility value via line 8c to the control unit 8. The control unit is connected to a keyboard 81 and to a storage unit 80.

The operation of such a sausage-casing filling machine shall now be described in the following text. The length-adjusting device 2 and the brake ring housing 5 are pivoted away from the filling tube 3 in a manner which is known per se and with the aid of the pivot lever mechanism 5. A folded sausage casing is mounted on the filling tube, and the length-adjusting device 2 as well as the brake ring housing 5 are pivotally returned. Sausage meat is filled into the filling machine 1 via the hopper 100. With the aid of the vane-cell pump which is positioned in the filling machine 1, the sausage meat is pressed out through the filling tube 3, thereby filling the sausage casing. The casing is thereby withdrawn from the filling tube 3. The filled sausage casing is gripped by the endless belts 2a and 2b which move in such a manner that they move the filled sausage away from the filling tube 3. A brake ring through which the sausage casing is removed with the aid of the length-adjusting device 2 from the filling tube 3 is located in the brake ring housing 5 for maintaining the necessary tension. After a portion of sausage meat has been pressed out by the filling machine 1 through the filling tube 3 for obtaining a single sausage, the filling tube 3 together with the folded sausage casing material that has not been filled yet is rotated by the twist-off gear 6. Since the already filled sausage casing is held by the length-adjusting device 2 and the endless belts 2a and 2b thereof, a constricted portion is created, resulting in the formation of individual sausages.

At the beginning of the filling process the user enters corresponding parameters into the control unit 8 with the aid of a keyboard 81, the control unit serving to control the filling machine and the length-adjusting device. Such parameters are, for instance, the desired length, the desired weight and the desired speed of the filling machine 1. On the basis of such entries, the control unit 8 determines the speed at which the drive 7 must drive the length-adjusting device 2, so that the sausage discharge speed simulates the actual filling-material output as much as possible. To this end, the user also enters the type of sausage meat and the dimensions of the filling tube. The control unit 8 then reads out the parameters pertaining to the sausage meat from the storage unit 80, e.g. compressibility, and determines the actual filling-material output characteristic to be expected at the filling tube end on the basis of this parameter and the other parameters entered. To this end, the control unit 8 can again resort to predetermined characteristics which are determined in the manner as will be described further below.

In contrast to the above-described process sequence, the user may determine the compressibility value for the actual sausage meat in advance and enter the value as a parameter. It is also possible that the pressure prevailing in the ejected sausage meat is determined with the aid of a pressure metering device 9 at the filling tube output or, for instance, at the filling material outlet of the machine (at the place where the filling material enters into the filling tube) and that compressibility is determined on the basis thereof and used for controlling the speed of the drive 7 for the length-adjusting device 2.

Figure 2:
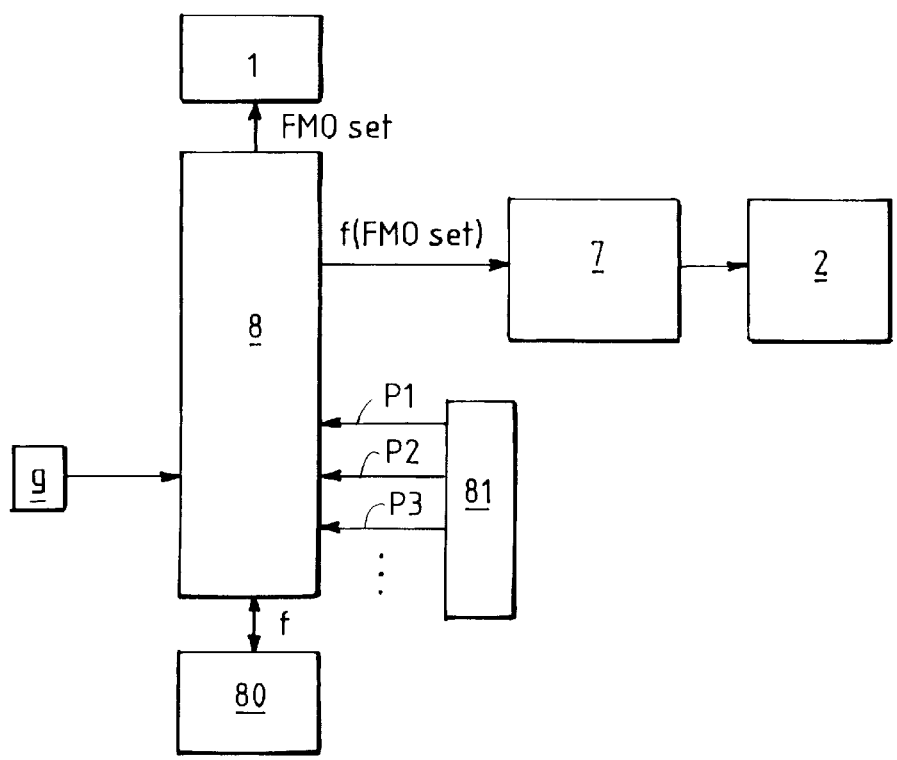
FIG. 2 is a block diagram for explaining the relationships between individual parameters.

FIG. 2 is a block diagram illustrating an embodiment for explaining the mode of operation of the control unit 8. The control unit 8 receives several values (e.g. portion volume, filling interval, or the like) as input. These values can be entered by the user via the keyboard 81. The control unit 8 calculates the set filling-material output characteristic on the basis of the values entered and transmits the value of this characteristic to the filling machine 1 ($FMO_{set}$). In accordance with this value the vane-cell pump is then operated for ejecting the sausage meat. The set value ($FMO_{set}$) which is transmitted to the vane-cell pump controls the drive of the vane-cell pump. The rotational movement of the vane-cell pump can then also be monitored via a sensor so that there can be some feedback to the control unit in the manner of a control operation. Such a sensor signal could also be used in an alternative manner directly as a set filling-material output characteristic signal.

Furthermore, the control unit 8 determines a function $f(FMO_{set})$ which depends on parameters p1, p2 and simulates as much as possible the actual filling-material output characteristic to be expected in the case of a predetermined set filling-material output characteristic and the parameters $p_1, p_2, \ldots$. The parameters $p_1, p_2 \ldots$ can also be entered on the input keyboard 81 and are, e.g., the compressibility of the sausage meat or the filling tube dimensions. As will be explained further below with reference to FIGS. 3a to 3d, the set filling-material output characteristic is time-dependent and is shown in the curves 50. The control unit 8 now applies the above-mentioned function f to this value of the set filling-material output characteristic. The functional value is e.g. converted into a voltage signal and supplied to the drive 7 of the length-adjusting device 2 which will then move the length-adjusting device 2 with a corresponding speed characteristic $$v_{AF} = f_{p1,p2,\ldots}(FMO_{set}(t))$$

wherein t is the time and $v_{AF}$ represents the sausage discharge speed of the length-adjusting device 2.

For the determination of function f the control unit 8 resorts to a storage unit 10 in which different function characteristics for different parameters p1, p2, p3, . . . are stored. As described above, these parameters were entered by the user via the keyboard 81 beforehand. Alternatively, it is also possible to measure the corresponding parameters, such as compressibility, during operation and to enter them automatically in their actual state. This is indicated by the connection of sensor 9.

Figure 3A:
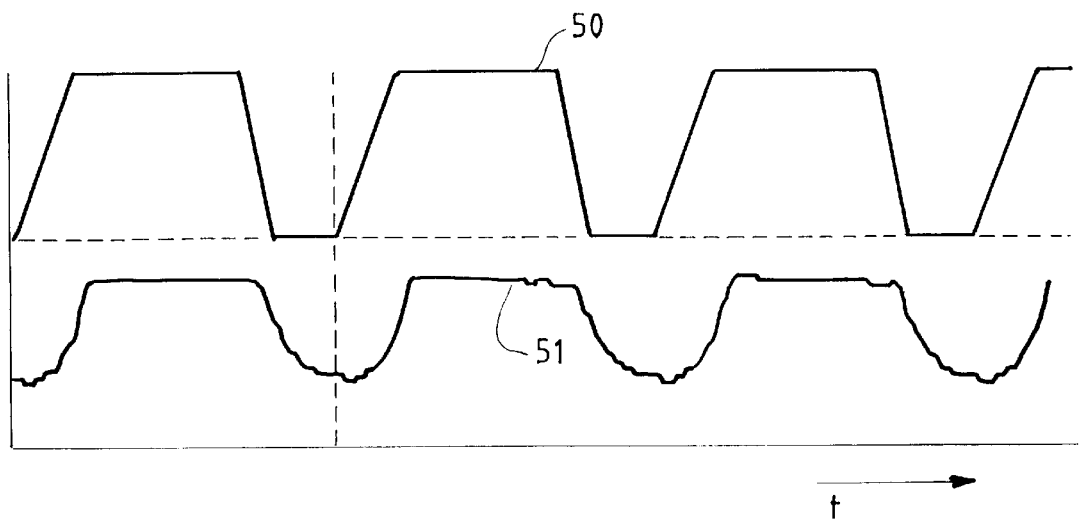
FIGS. 3a–3d show set-value/actual-value comparisons of the filling-material output characteristics with filling materials having different air amounts.
Figure 3B:
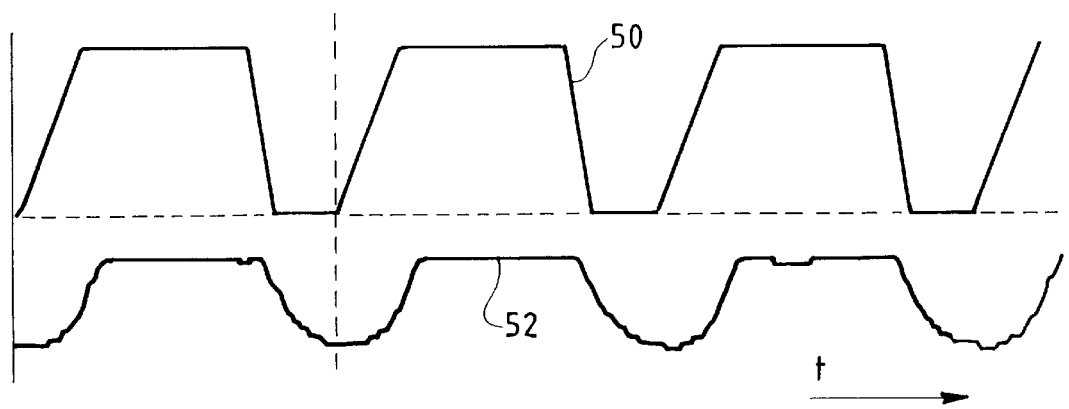
Figure 3C:
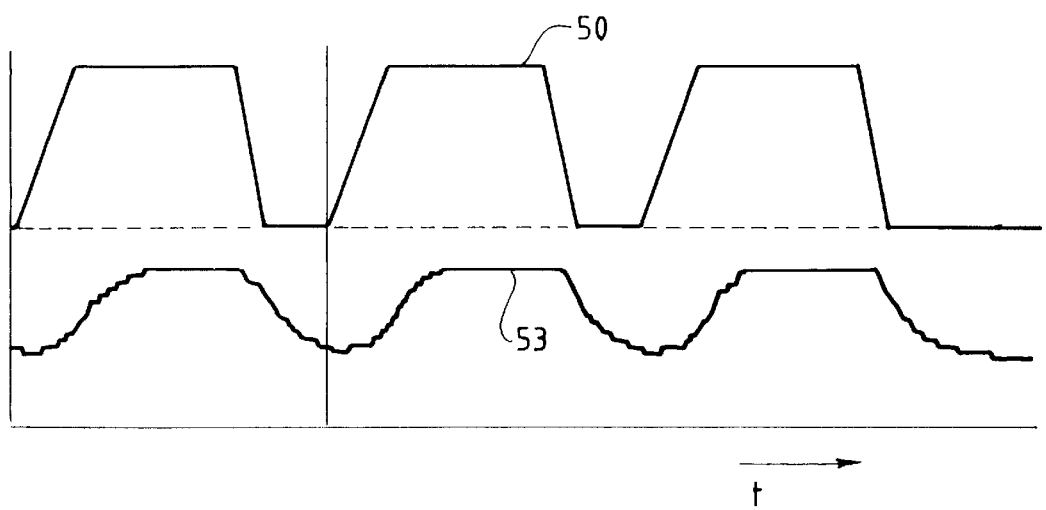
Figure 3D:
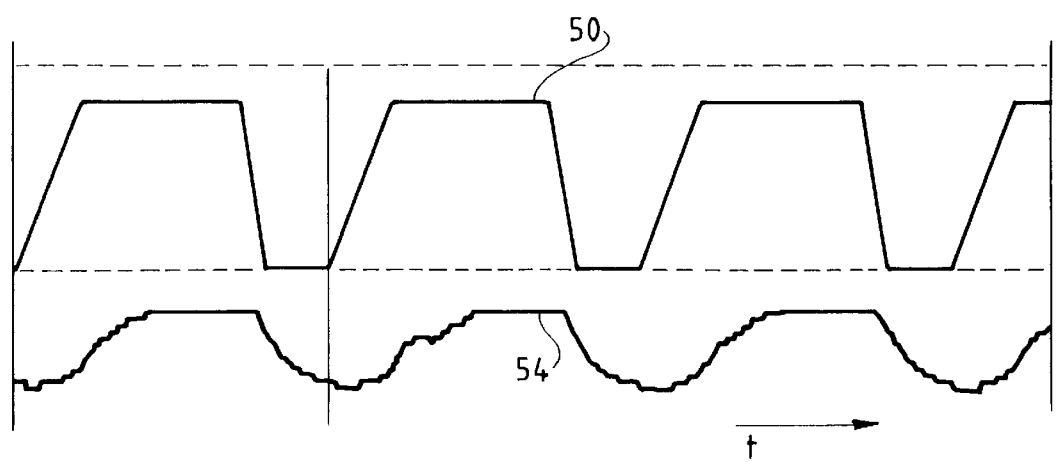

An example illustrating the determination of the functional characteristics f, which are stored in the storage unit 80, shall be given hereinafter. FIGS. 3a to 3d illustrate the actual filling-material output characteristics 51, 52, 53, 54 which are obtained for sausage meats having different air amounts when the same set filling-material output characteristic 50 is given. In FIG. 3a, the air amount is 8%, in FIG. 3b 12%, in FIG. 3c 14.5% and in FIG. 3d 18%. The set filling-material output characteristic 50 corresponds to the motional characteristic of the vane-cell pump in the filling machine 1 in dependence upon time t, with the pump pressing the sausage meat into the filling tube 3 accordingly. This set filling-material output characteristic is reproduced in an imperfect manner at the filling tube end. With a rising amount of air, the actual filling-material output characteristic becomes flat (see FIG. 3d), although the set characteristic has not been changed. As can in particular be seen, the angles of the rising and falling edges greatly vary in the case of the actual filling-material output characteristics of curves 51 to 54, depending on the air amount.

The filling-material output characteristics 51, 52, 53, 54 which have been determined by way of experiments can be stored in the storage unit 80 and can then be requested by the control unit 8 in dependence upon the compressibility of sausage meat to be actually processed so as to control the discharge speed $v_{AF}$ at a predetermined set filling-material output characteristic 50 in such a manner that the actual filling-material output characteristic can be taken into account as accurately as possible. Hence, when it is for instance known or has been measured previously that a specific sausage meat type to be actually filled has a compressibility of 14.5%, this parameter is entered into the control unit 81. The control unit 8 then retrieves the corresponding function (e.g. FIG. 3c) which has previously been determined for this air amount value, from the storage means 80, and can then adapt the conveying belt speed with this fucntion such that this speed is as close as possible to the filling-material output to be actually expected. This situation becomes even clearer from FIG. 4.

Figure 4:
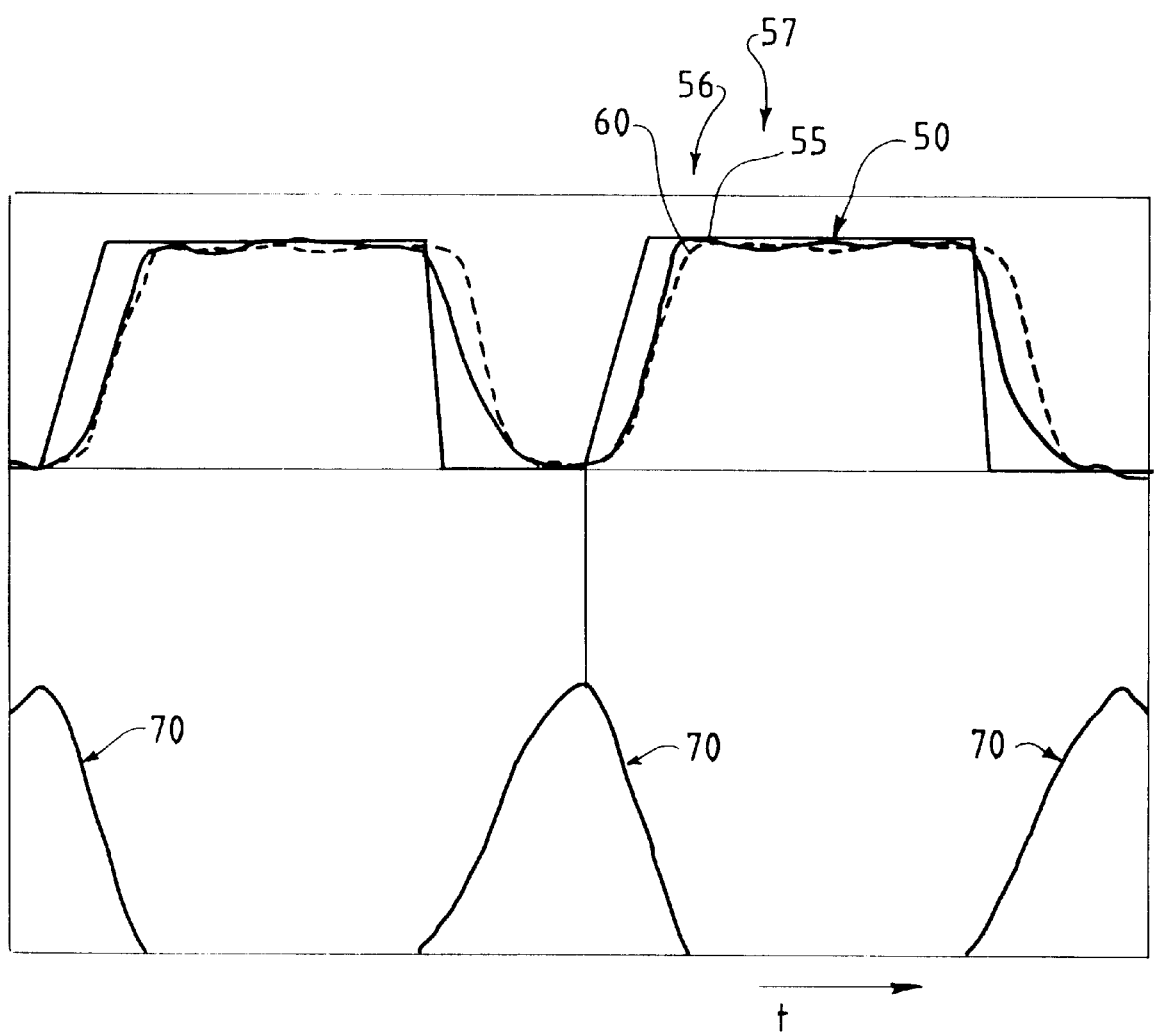
FIG. 4 is a diagram which shows the relationship between the actual filling-material output characteristic and the speed characteristic of the sausage discharge.

FIG. 4 illustrates the sausage discharge speed (conveying belt speed) $v_{AF}$ which is controlled according to the invention, by a broken line 60. 50, in turn, illustrates the set filling-material output characteristic which directly follows from the motional characteristic of the vane-cell pump. In case of a proportional control as in the prior art, the conveying belt would move with a speed profile in accordance with said curve 50.

As already mentioned, the filling material output which is actually accomplished does not take place in an ideal manner in accordance with curve 50 because of sausage meat-dependent parameters, for instance the air amount in the sausage meat or, for instance, the dimensions of the filling tube, but will for instance take place in the manner as shown by curve 55, which is also illustrated by an unbroken line.

This actual characteristic can be taken into account with the invention by the control unit 8 controlling the sausage discharge speed, i.e. the conveying belt speed $v_{AF}$, in accordance wih curve 60, which is shown in broken line. As can in particular be seen, in the region of the rising edges (region 56) the filling-material output rise to be actually expected can be adapted by a corresponding rise in the sausage discharge speed. To be more specific, different rise characteristics can then be reproduced. Hence, the constant rising edge which is represented by the set filling-material output characteristic 50 is not always used, but there is a variable operation depending on the actually used sausage meat. In the final analysis, this will relieve the sausage casing and lead to a very uniform filling. Therefore, it is possible with this measure to produce sausages of equal length and equal volume, also in a natural casing, which, in addition, have a constant external shape.

As can be seen in the respectively right rising flange portion, casing is withdrawn at the beginning of the filling end, i.e. when the filling-material output decreases, for a somewhat prolonged period of time (broken line). Hence, in this region the filling-material output reduction is deliberately not coupled with a sausage discharge speed reduction for a short period of time in order to apply twists without any tension with the aid of the casing additionally withdrawn thereby.

The characteristic of the twist-off gear is illustrated in FIG. 4 and provided with reference numeral 70.

The assignment to the phases of the filling-material output can be seen. As can particularly be seen, the twist-off operation is started in superimposed fashion with the filling-material output characteristic. At the maximum twist-off speed of the twist-off gear the filling-material output is zero and is then increasing again with a power reduction of the twist-off gear.

The control of the sausage discharge speed of the invention, i.e. the control of the motional characteristic of the length-adjusting device 2, makes it possible to produce sausages of equal length and equal volume also in the case of natural casings as the casing material, with the sausages having a uniform outer diameter.

We claim:

1. A method of filling sausage casings with a filling machine, comprising the steps of:
   ejecting filling material through a filling tube into a sausage casing,
   twisting off said casing after a respective portion which is representative of an individual sausage has been filled in, in order to form individual sausages,
   discharging the filled sausage casing at a speed ($V_{af}$) which is adjusted in dependence upon a set filling-material output characteristic ($FMO_{set}$), and
   choosing the sausage discharge speed ($V_{af}$, 60) in dependence upon the actual filling-material output characteristic to be expected, including parameters ($p_1, p_2, \ldots$) which influence the actual filling-material output characteristic.

2. The method according to claim 1, wherein said parameters p1, p2, . . . include the compressibility of the filling material.

3. The method according to claim 2, and the additional step of carrying out a pressure measurement in the filling material to be ejected for determining compressibility.

4. The method according to claim 2, wherein the compressibility of the filling material is determined in advance, and the dependency is chosen accordingly.

5. The method according to claims 1, wherein said parameters p1,p2, . . . include the dimensions of the filling tube.

6. The method according to claim 1, wherein said parameters p1,p2, . . . include the speed of the filling machine (1).

7. The method according to claim 1, wherein the set filling material output characteristic ($FMO_{set}(t)$) is directly determined on the basis of the motional characteristic of the filling device.

8. An apparatus for filling sausage casings with a filling material, comprising in combination a delivery pump, a filling tube, a length-adjusting device, a control unit which controls the speed of said length-adjusting device in dependence upon the actual filling-material output characteristic to be expected, and a sensor for determining the compressibility of said filling material.

9. The apparatus according to claim 8, wherein said sensor is a pressure sensor in the area of the outlet of said filling tube.

10. The apparatus according to claim 8 or 9, and a second control unit for storing actual filling-material output characteristics to be expected.

* * * * *

UNITED STATES PATENT AND TRADEMARK OFFICE
CERTIFICATE OF CORRECTION

PATENT NO. : 5,947,809
DATED : September 7, 1999
INVENTOR(S) : Gerhard Schliesser et al.

It is certified that error appears in the above-indentified patent and that said Letters Patent is hereby corrected as shown below:

Column 8, line 10 "claims 1" should be --claim 1--.

Signed and Sealed this

Twentieth Day of March, 2001

Attest:

NICHOLAS P. GODICI

Attesting Officer     Acting Director of the United States Patent and Trademark Office